(12) United States Patent
Ortlepp et al.

(10) Patent No.: US 9,896,784 B2
(45) Date of Patent: Feb. 20, 2018

(54) METHOD FOR PRODUCING A FLAT SEMI-FINISHED PRODUCT FROM A FIBER COMPOSITE MATERIAL AND FLAT SEMI-FINISHED PRODUCT

(71) Applicant: SGL AUTOMOTIVE CARBON FIBERS GMBH & CO. KG, Munich (DE)

(72) Inventors: Gerald Ortlepp, Uhlstaedt-Kirchhasel (DE); Renate Luetzkendorf, Koenigsee (DE); Thomas Reussmann, Rudolstadt (DE)

(73) Assignee: SGL Automotive Carbon Fibers GmbH & Co. KG, Munich (DE)

( * ) Notice: Subject to any disclaimer, the term of this patent is extended or adjusted under 35 U.S.C. 154(b) by 363 days.

(21) Appl. No.: 14/467,693

(22) Filed: Aug. 25, 2014

(65) Prior Publication Data

US 2016/0362817 A1   Dec. 15, 2016

Related U.S. Application Data

(60) Division of application No. 13/588,135, filed on Aug. 17, 2012, now abandoned, which is a continuation of
(Continued)

(30) Foreign Application Priority Data

Feb. 17, 2010   (DE) .................. 10 2010 008 370

(51) Int. Cl.
*D01G 15/00*   (2006.01)
*B29B 11/16*   (2006.01)
(Continued)

(52) U.S. Cl.
CPC .............. *D01G 15/00* (2013.01); *B29B 11/16* (2013.01); *D04H 3/002* (2013.01); *D04H 3/004* (2013.01);
(Continued)

(58) Field of Classification Search
CPC ........ D01G 15/00; D01G 15/40; D04G 3/002; B29B 11/16
See application file for complete search history.

(56) References Cited

U.S. PATENT DOCUMENTS 5,546,880 A      8/1996  Ronyak et al.
5,609,707 A  *   3/1997  Bazshushtari ........... D04H 1/46
                                                          156/148
(Continued)

FOREIGN PATENT DOCUMENTS

DE      197 39 486 A1     3/1998
DE      198 45 863 A1     4/2000
(Continued)

OTHER PUBLICATIONS

Rosato et al. "Concise Encyclopedia of Plastics", Springer, 2000, p. 268.
(Continued)

*Primary Examiner* — Shaun R Hurley
(74) *Attorney, Agent, or Firm* — Laurence A. Greenberg; Werner H. Stemer; Ralph E. Locher

(57) ABSTRACT

A method produces a flat semi-finished product from a fiber composite material that contains individual carbon fibers, carbon fiber bundles, or a mixture thereof in a defined anisotropic fiber orientation and a thermoplastic matrix material. The anisotropy of the carbon fibers is created in a carding process using the high orientability of admixed non-carbon textile fibers, at least some of the non-carbon textile fibers being thermoplastic, and the carbon fibers
(Continued)

having been isolated from waste or used parts. The flat fibrous web which is produced by a carding process and which has a specific orientation of the carbon fibers in the longitudinal direction is compressed into a sheet material under the effect of heat. This enables the use of carbon fibers, for example from production waste, as reinforcing fibers, whereby a less expensive raw material is provided and the carbon fibers are contained in the waste materials are recycled.

9 Claims, 1 Drawing Sheet

Related U.S. Application Data application No. PCT/EP2011/000486, filed on Feb. 3, 2011.

(51) Int. Cl.
| | |
|---|---|
| D04H 3/002 | (2012.01) |
| D04H 3/004 | (2012.01) |
| D04H 3/015 | (2012.01) |
| D04H 3/02 | (2006.01) |
| D04H 3/12 | (2006.01) |
| B29K 101/12 | (2006.01) |
| B29K 707/04 | (2006.01) |

(52) U.S. Cl.
CPC .............. *D04H 3/015* (2013.01); *D04H 3/02* (2013.01); *D04H 3/12* (2013.01); *B29K 2101/12* (2013.01); *B29K 2707/04* (2013.01); *Y10T 442/10* (2015.04); *Y10T 442/3715* (2015.04); *Y10T 442/644* (2015.04); *Y10T 442/645* (2015.04)

(56) References Cited

U.S. PATENT DOCUMENTS

| | | | |
|---|---|---|---|
| 5,879,802 A | 3/1999 | Beard et al. | |
| 6,355,337 B1 | 3/2002 | Piening et al. | |
| 7,132,025 B2 * | 11/2006 | Dittmar | B29C 70/465 |
| | | | 156/148 |
| 7,634,840 B2 | 12/2009 | Kobayashi et al. | |
| 8,540,830 B2 | 9/2013 | Brentrup et al. | |
| 2004/0028958 A1 * | 2/2004 | Assink | B27N 3/02 |
| | | | 442/149 |
| 2004/0242108 A1 * | 12/2004 | Russell | A01G 1/002 |
| | | | 442/414 |
| 2009/0110872 A1 | 4/2009 | DiFonzo et al. | |
| 2011/0057341 A1 | 3/2011 | Meier | |
| 2012/0183861 A1 * | 7/2012 | Gupta | D21H 13/00 |
| | | | 429/247 |
| 2013/0192434 A1 * | 8/2013 | Hashimoto | B29B 11/16 |
| | | | 83/13 |
| 2013/0196154 A1 * | 8/2013 | Ortlepp | B29B 9/04 |
| | | | 428/357 |
| 2013/0227820 A1 * | 9/2013 | Lutzkendorf | D01G 11/02 |
| | | | 19/82 |
| 2014/0173854 A1 * | 6/2014 | Hergeth | D01G 15/84 |
| | | | 19/114 |
| 2014/0245577 A1 * | 9/2014 | Sepati | D01G 11/00 |
| | | | 28/100 |

FOREIGN PATENT DOCUMENTS

| | | |
|---|---|---|
| DE | 101 51 761 A1 | 4/2003 |
| DE | 10 2008 002 846 A1 | 12/2009 |
| DE | 10 2009 023 641 A1 | 12/2010 |
| EP | 0 721 835 A2 | 7/1996 |
| EP | 1 696 057 A1 | 8/2006 |
| WO | 94/09972 A2 | 5/1994 |
| WO | 2006/105682 A1 | 10/2006 |
| WO | 2009135486 A1 | 11/2009 |

OTHER PUBLICATIONS

Chou, Tsu-Wei, "Microstructural design of fiber composites", Cambridge University Press, 2005, pp. 231-232, 256-258, 279.

* cited by examiner

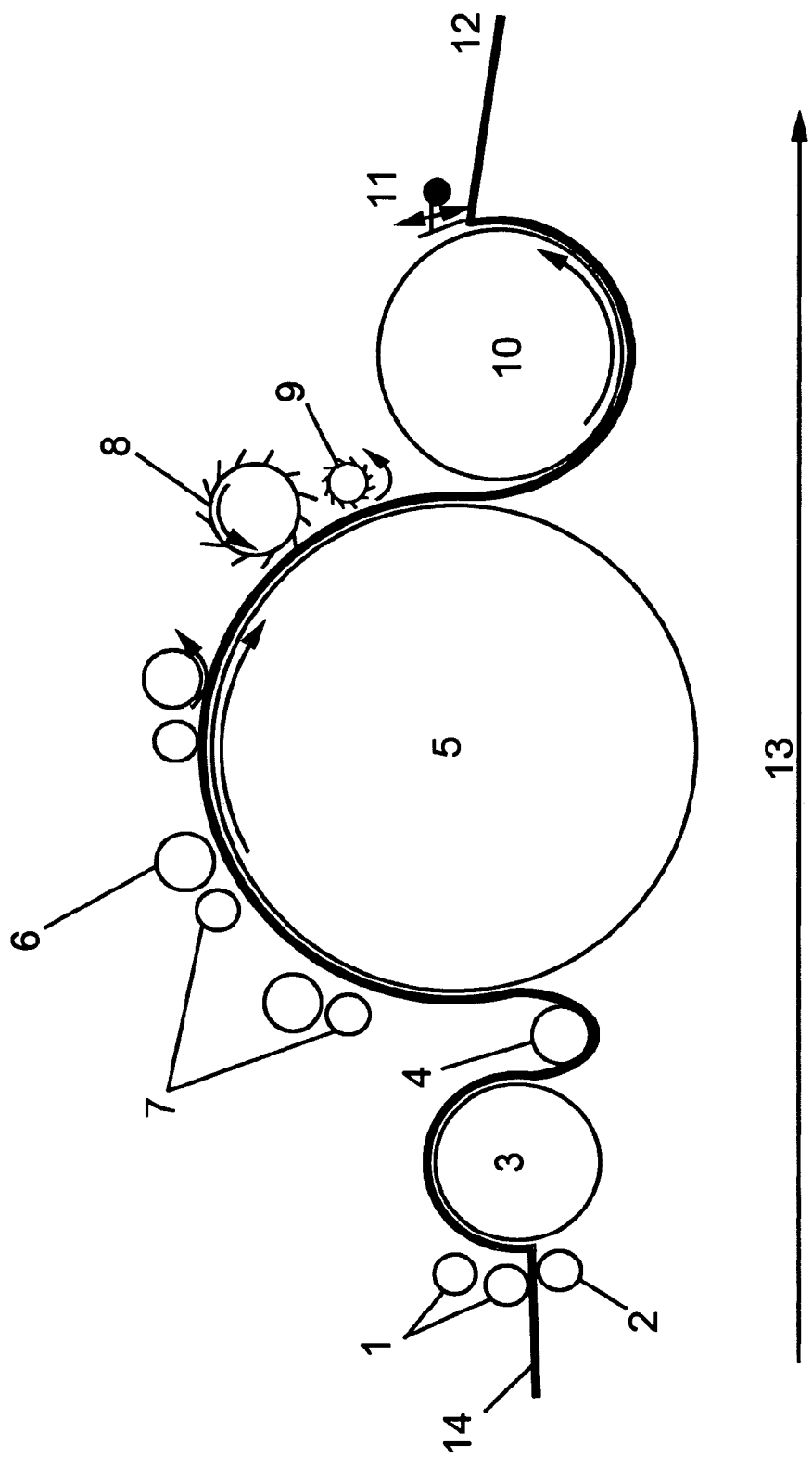

METHOD FOR PRODUCING A FLAT SEMI-FINISHED PRODUCT FROM A FIBER COMPOSITE MATERIAL AND FLAT SEMI-FINISHED PRODUCT

CROSS-REFERENCE TO RELATED APPLICATION

This application is a divisional of patent application Ser. No. 13/588,135, filed Aug. 17, 2012, which was a continuation of international application No. PCT/EP2011/000486, filed Feb. 3, 2011, which designated the United States; this application also claims the priority, under 35 U.S.C. § 119, of German patent application No. DE 10 2010 008 370.4, filed Feb. 17, 2010; the prior applications are herewith incorporated by reference in their entirety.

BACKGROUND OF THE INVENTION

Field of the Invention

The present invention relates to a method for producing a flat semifinished product from a fiber composite material containing fibers and at least one thermoplastic matrix material, wherein fibers are isolated from wastes or used parts containing fibers, then the fibers are blended with thermoplastic fibers and laid out in a sheet in a carding operation, thus producing a fiber web, which is pressed under the influence of heat to form a sheet material in at least one subsequent step.

Carbon fibers are used as the fiber reinforcement for fiber composite materials (FRP) bonded with a thermoplastic or thermoset plastic material. To achieve the maximum reinforcement effect, this has previously been done primarily in the form of continuous carbon fiber materials such as filament yarns, multifilament yarns or so-called rovings. However, carbon fibers used as cut fibers having finite fiber lengths in the range of 20 mm to 80 mm, for example, such as those known from the field of classical textile processing, are not available on the market, although they could be processed with fewer problems.

Carbon fiber materials have been used as high-performance fiber reinforcement to an increasing extent for several years now. The main applications are in aviation, shipbuilding, automotive engineering and wind power plants, for example. Due to the broader and broader mass application, the quantity of production waste containing carbon fibers has increased along with the volume of worn-out used parts. Because of their complex production process, carbon fibers are very expensive. Prices vary between approximately 15 €/kg and approximately 300 €/kg for special grades. It is therefore desirable for scientific reasons as well as for reasons pertaining to environmental policy to create possibilities for processing waste and used materials and to send the carbon fiber content contained in such waste for new applications in which it may at least partially replace expensive primary carbon fibers.

Although there have already been attempts in the industry to reuse production waste containing carbon fibers by chopping and/or milling the waste materials and using them for example as reinforcement in plastics or building materials, so far only a very small portion of such waste has been collected and marketed at all. So far no high-quality recycling has been developed for large quantities of waste containing carbon fibers, so they must be disposed of as garbage.

In the prior art, primary carbon fibers are usually produced either from suitable organic precursor fibers, such as polyacrylonitrile (PAN) or viscose fibers by controlled pyrolysis, or from pitch, whereby in this case a pitch fiber is first produced by melt spinning and then is oxidized and carbonized. A corresponding method is known from published, European patent application EP1 696 057 A1, corresponding to U.S. Pat. No. 7,634,840, for example, where the primary fibers produced from pitch are processed to staple fiber mats in which the fibers have an orientation in a preferred direction. The known method contains, among other things, a combing process for aligning the fibers in parallel. However, ultimately a yarn is produced from a carbon fiber web and thus a linear product.

It is known in principle from the prior art that a flat consolidated semi-finished product can be produced from a hybrid sheet containing reinforcing fibers of a finite length and thermoplastic matrix fibers. Published, non-prosecuted German patent application DE 10151761 A1 describes one such method, in which first a carded sheet of thermoplastic matrix fibers and natural fibers is produced and then passed through storage, a guide and finally a laying unit. After heating in a heating zone and consolidating, a flat semi-finished product is obtained. This document also mentions that carbon fibers may be used as reinforcing fibers instead of natural fibers.

International patent disclosure WO 94/09972 A2 describes a method for producing composite materials with oriented discontinuous reinforcing fibers in which first a fiber web is produced by carding a mixture of thermoplastic fibers and reinforcing fibers and then a fiber sheet is produced from that. Then multiple fiber sheets are fused together to produce a continuous thermoplastic phase, which then surrounds the discontinuous reinforcing fibers. This document also mentions the use of carbon fibers as reinforcing fibers, but these are traditional carbon fibers from primary production.

Published, non-prosecuted German patent application DE 10 2008 002 846 A1, corresponding to U.S. patent publication No. 2011/0057341, describes a waste processing method in which fibrous or fiber-reinforced semi-finished products are recycled. The fibers bound in a matrix material are separated from the matrix material and the resulting free fibers are wetted with a binder immediately thereafter. However, the separation of the fibers from the semi-finished product is performed in a furnace, i.e., by pyrolysis. The end product of this method is fiber bundles of wetted fibers although this document does not contain any information about their further processing.

German patent DE 198 45 863, corresponding to U.S. Pat. No. 6,355,337, describes a structural element containing unidirectional rovings of carbon-fiber-reinforced plastic, each embedded in sheathing. A great unidirectional stiffness is to be achieved with these structural elements which are provided for aviation. However, rovings with continuous fibers are used here. This document does not contain any reference to the use of fibers from recycling of fiber-based waste products or used parts.

Published, non-prosecuted German patent application DE 19739486 A1, corresponding to U.S. Pat. No. 5,879,802, describes a method for producing a flat semi-finished product of fiber-reinforced composite material of the generic type defined in the introduction in which a recycled thermoplastic material, namely fiber waste from carpet production is mixed with a waste material from production of automotive roof liners and then carded on a carding machine. The thermoplastic fibers may consist of polypropylene, polyethylene, nylon or PET. These fibers are shredded into strips up to approximately 50 mm long before further processing. The waste material from the production of roof liners is shredded by rollers having needle-like elevations and divided into strips. The two types of waste fiber materials are mixed and carded on a carding machine. This document does not contain any further statements to the effect that measures have been taken to achieve a targeted orientation of the fibers. In addition, this document also does not contain any suggestions for the use of carbon fibers from waste.

Published, non-prosecuted German patent application DE 197 39 486 A1, corresponding to U.S. Pat. No. 5,879,802, explains that products produced in this way are suitable only for "decorative automotive body parts, including those used for shock absorbing . . . ". The causes of these restrictions on use include the fact that in this method the glass and polyester fibers resulting from recycling of roof liners are used with a thermoplastic binder and secondly the carding technique is used only for production of mats but is not qualified for a targeted and high orientation of the reinforcing fibers in a preferential direction.

SUMMARY OF THE INVENTION

The object of the present invention is to make available a method for producing a flat semi-finished product of fiber-reinforced composite material of the type defined in the introduction in which carbon fibers that are available inexpensively can be used as the reinforcing fibers and a flat semi-finished product having an arrangement of reinforcing fibers that is suitable for loads can be implemented. Such a flat semi-finished product should be suitable in particular for the production of structural parts for high mechanical loads.

According to the invention it is provided that finite carbon fibers, carbon fiber bundles or mixtures thereof are isolated from wastes or used parts that contain fibers, then these finite fibers are mixed with thermoplastic non-carbon fibers laid out to form a flat web in a carding operation, thus producing a fibrous web having a targeted orientation of the fibers (in the longitudinal direction) which is then pressed under the influence of heat in at least one following step to form a sheet material.

Inexpensive high-performance carbon fibers are obtained from recycling processes and then are deposited in a mat-type semi-finished product together with thermoplastic non-carbon fibers in a preferential direction in a targeted manner so as to yield a reinforcing fiber configuration that is adequate for loads.

Carbon fibers are difficult to process by traditional carding techniques and in particular are difficult to align in a certain preferential direction in a card web because they are smooth and do not have any crimp. It has surprisingly been possible now by admixture of textile non-carbon fibers such as polypropylene to increase the degree of fiber orientation of the carbon fibers as well significantly and in a defined manner. The degree of longitudinal orientation of the carbon fibers in the card web depends on the geometry of the added non-carbon fibers, in particular the fiber length and the amount added, among other things. Small amounts of non-carbon fibers, for example, approximately 10% and short non-carbon fibers, for example, on the order of 35-40 mm yield lower degrees of fiber orientation. Long non-carbon fibers more than 60 mm in length, for example, and amounts of more than 30% for example yield a high-fiber orientation of the carbon fibers.

The utilization of auxiliary fibers for influencing the degree of fiber orientation of carbon fibers in a card web in a targeted manner is not described in any of the prior art documents cited above.

The carbon fibers can be extracted and separated from used parts or wastes, for example, of the product categories of woven fabrics, non-crimp fabrics, braidings or materials in the form of preforms and/or from waste materials or used products from the product category of fiber-reinforced composite materials in a cardable fiber and/or fiber bundle form in an unorganized arrangement and with average fiber lengths and fiber bundle lengths, preferably in the range of 20 mm to 150 mm, more preferably approximately 40 mm to approximately 70 mm. One example of a suitable device for separating textile fiber bundles into individual fibers is described in published, non-prosecuted German patent application DE 10 2009 023641 A1, the content of which is herewith referenced. In addition, tearing and reprocessing of hard carbon-fiber-reinforced composite plastics (CFRP) by pyrolysis or solvent treatment are also known as separating processes.

According to the invention, the most homogeneous possible mixture of thermoplastic bonding fibers and finite carbon fibers, carbon fiber bundles or mixtures thereof is preferably processed by a carding operation to form a fiber mat. The carbon fibers are more or less oriented in a targeted manner, and portions of the thermoplastic fibers are converted by heat to a tacky state, then compacted and pressed to form a flat material, which is then cooled.

The method according to the invention makes it possible to use carbon fibers, carbon fiber bundles or mixtures thereof, such as those obtained by separation from textile production waste, bonded or cured production waste, reprocessed used CFRP components or the like from reinforcing fibers, a less expensive starting material is thus available and the carbon fibers contained in the aforementioned used materials can be recycled appropriately. The method according to the invention is thus advantageously not limited to chopped woven fabric residues as the starting material. Other forms of waste that are generated in much larger quantities such as non crimp fabrics, braids, stacks, bonded multilayer semi-finished products or even fully cured CFRP residues and used parts may serve as a source for recycled carbon fibers isolated therefrom and can also be used in this method. The same is also true of separated recycled fibers, recycled fiber bundles or mixtures thereof obtained from independent processes such as tearing, a hammer mill treatment or a thermal/chemical reprocessing method. These carbon fibers cannot be oriented in a targeted and defined manner by using traditional methods because of their high degree of separation into individual fibers and existing nonwoven layer and loops in a web. However, the present method makes this possible and therefore allows fibers/fiber bundles of such sources to be processed to prepregs with a uniform weight per unit of area.

In the case of carbon waste or used parts impregnated with adhesive resins or CFRP components or component residues in which the carbon fibers are embedded in a solid-state composite, the carbon fibers are first freed of the interfering matrix substances. For example, pyrolysis techniques have been used for this or the wastes are treated with supercritical solvents. These separation processes yield finite carbon fibers, carbon fiber bundles or mixtures thereof as a web.

A preferred feature of the method according to the present invention is that the starting material contains at least a certain amount of carbon fibers derived from reprocessing of textile-type carbon waste and/or from sorted recycling of CFRP components plus optionally a portion of chopped primary fibers (new material).

First, at least one layer of finite carbon fibers is produced by laying out finite carbon fibers in a flat-sheet in a carding operation. Unlike the prior art, a card sliver is not produced first but instead a fiber layer being fed into the carding system is processed directly to form a thin fibrous web having a uniform weight per unit of area.

According to a preferred refinement of the invention, a largely homogeneous mixture of random bonded thermoplastic fibers and random finite carbon fibers and/or tangled carbon fiber bundles is aligned by a carding operation and processed to form a fiber mat, at least some portions of the thermoplastic fibers are converted to a tacky state by applying heat and then pressed to form a sheet material and then cooled.

The carbon fibers and/or carbon fiber bundles that are used according to the invention preferably have an average fiber length of 10 mm to 150 mm, preferably from 25 mm to 150 mm. When using very short carbon fibers and/or carbon fiber bundles with an average fiber length of 10 mm to 15 mm, the cardability is determined by a necessary amount of longer backing fibers. The rule here is that the shorter the carbon fibers, the greater the amount of longer backing fibers that should additionally be fed to the carding machine. These may be longer carbon fibers as well as longer non-carbon-based fibers.

Within the context of the present invention, there are various preferred options for mixing the carbon fibers and/or the carbon fiber bundles with the thermoplastic matrix material. For example, carbon fibers and thermoplastic fibers may each be sent as a separate layer to the input of a carding system and then blended in this carding machine.

In this way, for example, a thermoplastic component in the form of finite fibers may be mixed thoroughly and homogeneously with the carbon fibers before or during the formation of a layer.

For example, individual fiber components, namely carbon fibers, thermoplastic matrix fibers and optionally additional fibers of different compositions, but each being pure on its own, may be deposited in various flat layers as fibrous webs or as nonwoven sheeting, one above the other, and then measures may be taken to achieve adequate penetration of all layers by the thermoplastic matrix component and compact bonding of the layers to one another after thermal solidification.

Within the context of the present invention, it is preferable to produce a mixture of random carbon fibers, random carbon fiber bundles or mixtures thereof and thermoplastic bonding fibers by an independent fiber blending operation prior to production of the fiber mat or by a fiber blending ration during the formation of the mat.

A semi-finished product according to the invention may also contain a certain amount of carbon fibers in the form of finite primary material (new material) in addition to carbon fibers from waste or used parts containing carbon fibers. This flat semi-finished product may also contain, for example, additional fiber components in finite form having a reinforcing effect, in particular para-aramid, glass fibers, natural fibers, non-melting manmade fibers and/or fibers having a higher melting point than the matrix fibers may also be used in addition to carbon fibers.

Generally known dry techniques such as nonwoven carding may be used as techniques for producing carbon-fiber-containing flat sheets according to the invention, in particular having a uniform mass or volume per unit of area, depending on the type of finite carbon fibers to be used, primarily depending on the prevailing fiber length, fiber length distribution. Carbon fiber starting materials for this method include, for example:

shredded primary fibers, shredded and/or frayed non crimp fabric, woven fabric or braiding residues, shredded and/or frayed fiber wastes, roving residues, edge cuttings from production of non crimp fabrics or residual bobbin material, shredded and/or frayed and/or thermally pretreated prepreg wastes or solvent-pretreated prepreg waste or shredded and/or frayed and thermally treated resin-containing wastes or solvent-treated waste, hard CFRP parts and used parts.

More specific and preferred embodiment variants of the method according to the invention are explained in greater detail below as examples.

Fibrous admixed components such as thermoplastic fibers which will subsequently have a bonding effect may be mixed homogeneously with the carbon fibers in the carding machine, for example, in an independent step before formation of the layers, e.g., via a textile fiber mixing line, or directly during the formation of the layers, e.g., in a carding machine. For example, the carbon fibers in an intimate and homogeneous mixture are processed to form a flat fibrous web with a uniform weight per unit of area for example by a textile carding machine which has been adapted to the processing of carbon fibers with respect to its roll fittings and which is sealed with respect to the outside to prevent the escape of electrically conductive carbon fiber dust. The fibrous web having a uniform weight per unit of area, preferably approximately 15 to 60 $g/m^2$ is lined, for example, in a downstream lining operation until achieving the desired final weight per unit of area of the thermally bonded semi-finished product with longitudinal or transverse liners, or this is achieved by moving a number of n webs of n carding machines operating in series and passing them over one another.

The weight per unit of area of the web coating can be adjusted in a defined manner based on the parameters of the weight per unit of area of the web discharged from the carding machine, and the lining process. Different fiber length orientations in the card web can be achieved through the choice of the carding parameters, in particular the ratio of the fiber intake speed and the fiber discharge speed. This adjustment in the carding machine and/or an additional following nonwoven drawing of a card web that has previously been lined or doubled repeatedly allow a degree of fiber orientation to develop, such that in an FRCP sheet produced therefrom with a thermoplastic matrix, for example, a polypropylene matrix, anisotropies of the composite strengths and/or composite stiffnesses can be adjusted in the range of 1:1.5 to 1:10, preferably 1:2 to 1:7 in particular. The desired fiber orientation (anisotropy) is determined on a fiber composite material sheet (FRCP sheet).

Such an FRCP sheet is produced according to the following specifications, for example:

punching of card webs consisting of a mixture of carbon fibers and polypropylene fibers to yield pieces with a length of x cm and a width of y cm, which may also be square, for example;

if the carbon fiber content in the card web exceeds approximately 40%, the PP film is preferably additionally punched out with approximately the same length and width;

several layers of the carbon card webs are laid one above the other, wherein the webs are laid one above the other in the same direction of travel. If the carbon content in the card web exceeds approximately 40%, then the PP films additionally punched out, starting at the top side and bottom side, are preferably inserted between the card web layers, also in alternation, if necessary;

the sandwich thereby formed is pressed in a sheet press at temperatures of approximately 200° C., for example, and at a pressure of approximately 400 N/cm$^2$, for example, which is set on the press;

after cooling, preferably rectangular sample bodies are cut from the CF/PP composite, cutting once longitudinally and once at a 90° angle to the fiber orientation, so that then the tensile stresses can be determined in MPa and the tensile E-modulus can be determined in GPa, for example;

wherein a quotient of the two averages of at least five individual measurements of the tensile stresses and/or the tensile E-modulus in the running direction of the carding machine and across the running direction of the carding machine yields the anisotropy.

After the process steps of fiber blending, carding, lining/doubling, nonwoven drawing (if necessary), this loose, flat fiber nonwoven of a uniform mixture and weight, consisting of finite aligned carbon fibers and textile thermoplastic fibers may be heated to such an extent that the thermoplastic fibers soften or melt and can then be compacted by pressing pressure, and are solidified while cooling under pressure or without any additional external mechanical pressure. The sheet products produced in this way can then be rolled up, for example, cut to form sheets or punched to form irregular flat shapes.

The amount of the thermoplastic component preferably determines the compactness of the product that can be achieved. There are no technological limits on the thermoplastic fiber content in the carbon fibers. From a product standpoint, use will vary in the range of 5% to 95% carbon fiber content, preferably in the range of 30% to 80% carbon fibers.

In addition to the carbon fibers, other finite fiber materials such as natural fibers, para-aramid fibers, glass fibers, ceramic fibers or polyacrylonitrile fibers may also be used in this process. These fibers are blended intimately and homogeneously with one another before being carded or during the carding by analogy with the thermoplastic fibers.

The thoroughly homogeneous blending on the carding machine is preferably accomplished by the fact that a fiber coating of an accurate weight per unit of area and a constant weight per unit of area is supplied to the carding machine; the different fiber substances to be blended in the carding machine are supplied as fiber layers arranged one above the other with the most accurate possible weight per unit of area and a constant weight per unit of area of the fiber layers. Such layers that are accurate per unit of area and are constant per unit of area and can be produced by running loose fibers from series-connected conventional carding machine feeds such as filling chutes, fiber spreaders or by only slightly solidified separate nonwoven layers. The fibrous composition of the individual layers may vary, and individual layers may already consist of a defined mixture of different fiber materials.

The fiber webs that can be produced by such a carding operation having oriented carbon fibers may additionally be combined with known reinforcing structures of continuous fiber materials such as threads, rovings, non crimp fabrics, wovens, meshes, braidings and knits that are bonded to the fiber web layers of the carding machine in the thermal solidification process to form a semi-finished product for fiber-reinforced composite materials with a thermoplastic matrix.

Depending on the carbon fiber lengths, they can be introduced directly into the process of forming the layer or may be further shredded to improve processability and/or may be finished and/or blended with a sizing, adhesion-promoting substances or other additional agents that would have effects in the plastic products such as flame retardants, dyes, unmolding aids or tribology aids. It is also possible to add functional non-carbon fiber materials in addition to the carbon fiber materials for impact modification, for example, or for mechanical reinforcement such as para-aramid, glass fibers, natural fibers or non-melting manmade fibers and/or fibers having a melting point higher than that of the matrix fibers. Fibrous additive components such as thermoplastic fibers which later have a bonding effect may be blended as thoroughly and homogeneously as possible with the remaining fiber components in an independent process step before forming the layer, e.g., in a textile fiber mixing line or directly during the formation of the layer, e.g., in a carding machine. If the possibilities of a system mixing are utilized, the individual fiber components in pure form are deposited over one another, for example, in different layers as the fiber web or nonwoven webs. It is important here that the thermoplastic bonding component penetrates through all the layers to ensure a compact bonding of all the layers to one another after thermal solidification. This can be achieved by homogeneously mixing all the components together, for example, with an alternating structure of thin layers with thermoplastic and reinforcing component or by extensive needling of thermoplastic bonding fibers by the carbon fiber layer, for example, using a needling operation. In the case of thin layers or good impregnability with a thermoplastic melt, a sandwich structure in which the non-melting components are arranged as a core layer is sufficient.

As a rule, a wide variety of thermoplastic matrices known from the prior art may be considered for use as the thermoplastic bonding component here. This ranges from low-melting polyethylene to polypropylene, polyamides to the high-melting thermoplastics PEEK or PEI. The thermal solidification parameters such as temperature, dwell time, pressure and possible use of an inert gas atmosphere must be adapted to the particular details of these polymers. The forms of the thermoplastic bonding components that can be used range from small particles such as powders to short fibers, long textile fibers, nonwoven layers or fibrous layers, spun-bonded nonwovens, films and polymer melts.

After combining the finite carbon fibers with the thermoplastic binders in a flat layer arrangement with the most constant possible weight ratio of carbon fiber to thermoplastic, this coating is heated so that the thermoplastic component softens or melts. When using a polymer melt, however, this step would not be necessary. The thermoplastic material may be applied through flat-sheet dies to the carbon fiber layer—then compacted by applying pressure and solidified while cooling under pressure without any additional external mechanical pressure.

The amount of the thermoplastic component determines the achievable compactness of the sheet material. The lower limit of the thermoplastic component is preferably approximately 5%, wherein carbon fibers and the thermoplastic component should be mixed together as homogeneously and thoroughly as possible in order to achieve a detectable solidification effect. In sandwich methods, a minimum binder content of approximately 15% to 25% is advantageous.

The hardness of the flat semi-finished product sheeting can be varied in a wide range by varying the amount of the thermoplastic component. This ranges from a compact porefree state to an increasing porosity and then to a thermally solidified fiber nonwoven condition of a low density. In addition to the carbon fiber substances that are used, additional fiber substances in a finite form may also be used. These may be added before or during the formation of the layer or as separate system components in the layering of the material by analogy with the carbon fiber components through fiber mixing processes.

The subject matter of the present invention is also a flat semi-finished product of a fiber-reinforced composite plastic which was produced in a method of the aforementioned type and in which the amount of thermoplastic matrix material in the semi-finished product is in a range between approximately 5% and approximately 95%, preferably approximately 30% to approximately 70%.

With such a flat semi-finished product it is preferable for the carbon fibers, carbon fiber bundles or mixture thereof to have finite lengths and/or to have a length distribution and for the carbon fibers and/or carbon fiber bundles to be present in the semi-finished material in such a way that portions thereof do not permeate throughout the entire semi-finished product without interruption.

In addition, it is preferable for this flat semi-finished product to be produced from finite carbon fibers, carbon fiber bundles or mixtures thereof and additional finite-reinforcing fibers, in particular selected from natural fibers, para-aramid fibers and glass fibers. For example, such a flat semi-finished product can also be combined with continuous reinforcing fibers such as continuous carbon rovings, para-aramid yarns and/or glass filament yarns in the form of threads, non crimp fabrics, woven fabrics or meshes.

The features cited in the dependent claims relate to preferred refinements of the solution to the problem according to the invention. Additional advantages of the invention are derived from the following detailed description.

The present invention is explained in greater detail below on the basis of specific exemplary embodiments. It is self-evident that these exemplary embodiments are only examples and the invention is in no way limited to the specific measures and parameters defined therein.

Exemplary Embodiment 1

A homogeneous fiber blend of 70% polypropylene of the fineness 7 dtex and a nominal fiber length of 60 mm and 30% waste carbon fibers from non-crimp fabric production with an average fiber length of 65 mm were processed on a carding machine equipped with three worker/turner pairs to form a fiber web with a weight per unit of area of 25 g/m$^2$. The carding operation created such a longitudinal orientation of the fiber in the fiber web that a fiber-reinforced composite plastic was obtained by processing 10 layers of this web by placing them one above the other in the same direction of the material and then pressing them in a plate press at 200° C. and at a pressure of 400 N/cm$^2$ set in the press; this fiber-reinforced composite plastic product had a tensile E-modulus value that was higher by a factor of 5 in the running direction of the carded web in fiber-reinforced composite plastic in comparison with the modulus at an angle of 90° thereto.

Exemplary Embodiment 2

The processing a fiber/fiber blend to form flat semi-finished materials is now described.

For the production of sheets of carbon-fiber-based semi-finished products, recycled carbon fibers with an average fiber length of 40 mm and a commercial textile PA6 staple fiber of 3.3 dtex, 60 mm were used as the starting materials for the production of flat carbon-fiber-based semi-finished materials. The two materials were blended together thoroughly in a weight ratio of 30% PA6 and 70% recycled carbon fibers (RCF) via a mixing bed of a type conventional in the textile industry and then using a mixed opening technique as so-called flock mixture. This fiber mixture was then placed in a carding system. The fiber orientation produced in the fiber web due to the carding operation was such that when processing 10 layers of this web by stacking them one above the other in the same direction of the material with intermediate insertion of PA6 films to a final carbon fiber content of 35% and pressing this in a plate press at 240° C., this would yield a fiber-reinforced composite plastic having a tensile E-modulus in the running direction of the carded web in the fiber-reinforced composite plastic that was higher by a factor of 3 than the modulus measured at a 90° angle thereto.

Exemplary Embodiment 3

The processing of a flat system mixture to form sheets of semi-finished products is now described.

On a carding system using a transverse liner with a downstream needling machine 2, nonwoven webs were produced with a weight per unit of area of 180 g/m$^2$ comprised of 100% commercial textile PA6 fiber of 3.3 dtex, 60 mm. The two nonwoven webs were needled lightly only once from above at 12 stitches/cm$^2$. In a downstream operation, recycled carbon fibers obtained 100% from fabric wastes having an average fiber length of 40 mm were processed by a carding technique modified technically to work specifically in processing carbon fibers to form a flat card web with a uniform weight per unit of area of 30 g/m$^2$ of card web, and this web which was drawn off continuously from the carding machine with a transverse liner was deposited on a deposit sheet running continuously at a 90° angle to the former in a transverse and overlapping arrangement so as to yield a weight per unit of area of 780 g/m$^2$. One of the needled nonwoven webs finished previously was laid out between the deposit sheet and the carbon fiber web layer system to be lined so that the carbon fiber layering was arranged on the PA6 needled nonwoven.

Before being fed into the downstream needling machine, the second PA6 needled nonwoven having 180 g/m$^2$ was rolled up as the cover layer so that this formed a sandwich construction of 180 g/m$^2$ PA6 needled nonwoven—780 g/m$^2$ RCF web layering—180 g/m$^2$ PA6 needled nonwoven. The sandwich was needled and solidified from above and below with 25 stitches/cm$^2$. Portions of the PA6 nonwoven cover layers were needled through the RCF layer by this needling operation, which had a positive effect on the stability of the degree of thermal solidification to be achieved subsequently. The needled nonwovens produced in this way with a PA6 outer layer and RCF in the core area were stacked one above the other as pieces measuring 30 cm×30 cm and were pressed using a multiplaten press for 100 s at 240° C. and 50 bar and then cooled. Soft, as yet unsolidified edges were removed from the resulting sheets using guillotine shears.

Other features which are considered as characteristic for the invention are set forth in the appended claims.

Although the invention is illustrated and described herein as embodied in a method for producing a flat semi-finished product from a fiber composite material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a simplified schematic diagram showing the principle operation of a carding system, which is suitable, for example, for producing a fiber web containing carbon fibers by a method according to the present invention.

DETAILED DESCRIPTION OF THE INVENTION

Referring now to the single FIGURE of the drawing in detail, there is shown at least one fiber layer 14 (at the left in the drawing) being fed into the carding system, passing initially over feed rollers 1, 2 onto a licker-in 3 rotating in the opposite direction from the intake rollers. A transfer roller 4 rotating in a direction opposite that of the licker-in 3 and the main drum 5 is arranged between the licker-in 3 and the main drum 5 (tambour) rotating in the same direction of rotation as the licker-in 3. Various workers 6 and turners 7 are arranged on the circumference of the main drum 5 in various circumferential positions. The object of these devices is to shred the incoming fiber layer 14 in the carding system down to individual fibers and then shape them back into a thin fiber web having a uniform weight and a defined weight per unit of area. A longitudinal fiber orientation is preferably the goal here.

Downstream from the main drum 5 in the travel direction 13, a takeoff drum 10 rotating in the opposite direction is arranged downstream from a wheel 8 with a wheel cleaner 9, a hacker 11 being situated on the downstream end of the drum. A fiber web 12 in the form of a continuous surface with a weight per unit of area up to max. approximately 80 g/m$^2$, preferably approximately 15-30 g/m$^2$, is discharged from this takeoff drum 10, wherein the carbon fibers which are present in the web in a proportional amount have a preferred longitudinal orientation of the fibers, which is set in a defined manner.

The invention claimed is:

1. A method for producing a flat semi-finished material of a fiber-reinforced composite plastic having fibers and at least one thermoplastic matrix material, which comprises the steps of:
    isolating the fibers, selected from the group consisting of finite carbon fibers, carbon fiber bundles and a mixture of said finite carbon fibers and said carbon fiber bundles, from waste or used parts containing carbon fibers;
    blending the fibers with thermoplastic non-carbon fibers resulting in a mixture being laid down and oriented in a sheet in a carding operation resulting in a fiber web having a targeted orientation of the fibers, wherein for the targeted orientation of the fibers longitudinally in the carding operation, adding the thermoplastic non-carbon fibers in a mixing ratio and/or with a fiber geometry, such that a fiber anisotropy in a range of at least 1:2 is established in the fiber web;
    performing a lining operation on the fiber web to yield a web layering and after the lining operation influencing the fiber anisotropy of composite strengths and/or composite stiffnesses by an additional drawing of a nonwoven; and
    pressing the fiber web to form a sheet material under an influence of heat.

2. The method according to claim 1, which further comprises providing the thermoplastic non-carbon fibers to have fiber lengths in a range of 25 mm to 120 mm.

3. The method according to claim 1, which further comprises:
    aligning the mixture being a largely homogeneous mixture of thermoplastic bonded random fibers and random finite carbon fibers, random carbon fiber bundles or a mixture of the random finite carbon fibers and the random carbon fiber bundles by the carding operation;
    laying out the mixture to form a fiber mat;
    bringing at least portions of the thermoplastic non-carbon fibers to a tacky state by heat, and then compacting and pressing to form the sheet material; and
    cooling the sheet material.

4. The method according to claim 1, wherein the carbon fibers, the carbon fiber bundles or the mixture of the carbon fibers and the carbon fiber bundles have an average fiber length of 10 mm to 150 mm.

5. The method according to claim 1, wherein at least a portion of the carbon fibers originate from reprocessing of textile type carbon waste and/or from physical recycling of carbon fiber reinforced plastic components.

6. The method according to claim 3, wherein the mixture of the carbon fibers, the carbon fiber bundles or the mixture of the carbon fibers and the carbon fiber bundles and the thermoplastic non-carbon fibers is produced by a fiber-mixing operation during a formation of the fiber mat.

7. The method according to claim 1, which further comprises producing a targeted degree of orientation of the carbon fibers, the carbon fiber bundles or the mixture of the carbon fibers and the carbon fiber bundles which are initially unoriented as to direction, using a carding machine in such a way that the fiber anisotropy of the composite strengths and/or the composite stiffnesses in a range of 1:1.5 to 1:10 is achieved in a fiber composite material.

8. The method according to claim 1, which further comprises providing the thermoplastic non-carbon fibers to have fiber lengths in a range of 40 mm to 100 mm.

9. The method according to claim 1, wherein the carbon fibers, the carbon fiber bundles or the mixture of the carbon fibers and the carbon fiber bundles have an average fiber length of 25 mm to 150 mm.

* * * * *